United States Patent [19]
Borvitz

[11] Patent Number: 5,168,799
[45] Date of Patent: Dec. 8, 1992

[54] APPARATUS FOR THE CUTTING OUT OF VEGETABLE HEADS

[75] Inventor: Wolfgang Borvitz, Brunswick, Fed. Rep. of Germany

[73] Assignee: Herbort Maschinenbau GmbH, Brunswick, Fed. Rep. of Germany

[21] Appl. No.: 819,133

[22] Filed: Jan. 10, 1992

[30] Foreign Application Priority Data

Jan. 12, 1991 [DE] Fed. Rep. of Germany ....... 4100766

[51] Int. Cl.$^5$ .................. A23N 15/00; A47J 23/00; G01B 7/02; G01B 7/12
[52] U.S. Cl. ....................................... 99/491; 99/486; 99/538; 99/541; 99/544; 99/638
[58] Field of Search .................. 99/485, 486, 489–491, 99/493, 537, 538, 588, 590, 593, 635–638, 640–643; 83/72–74, 76.1

[56] References Cited

U.S. PATENT DOCUMENTS

| | | | |
|---|---|---|---|
| 3,302,677 | 2/1967 | Oldershaw | 99/491 |
| 3,646,977 | 3/1972 | Goodale | 99/635 |
| 3,886,857 | 6/1975 | Goodale | 99/642 |
| 4,031,821 | 6/1977 | Loose et al. | 99/643 |
| 4,099,456 | 7/1978 | Cornish | 99/638 |
| 4,176,595 | 12/1979 | Shaw | 99/638 |
| 4,337,693 | 7/1982 | Dandrea | 99/491 |
| 4,453,458 | 6/1984 | Altman | 99/544 |
| 4,503,761 | 3/1985 | Cailloux | 99/636 |
| 4,658,714 | 4/1987 | McIlvain et al. | 99/637 |
| 4,787,305 | 11/1988 | Akesson | 99/638 |

FOREIGN PATENT DOCUMENTS

| | | |
|---|---|---|
| 0244387 | 4/1987 | European Pat. Off. . |
| 2750820 | 11/1977 | Fed. Rep. of Germany . |
| 2376632 | 9/1978 | France ................... 99/638 |

*Primary Examiner*—Timothy F. Simone
*Attorney, Agent, or Firm*—Foley & Lardner

[57] ABSTRACT

An apparatus for the cutting out of vegetable heads, in particular cauliflower, fruits or parts thereof which have on their underside a central part (stipe), which is to be cut out from the surrounding part along a hemispherical or ogival face. The diameter of the cauliflower is established and the value determined is used for setting and controlling the cutter which is guided on a circular path, for adapting the diameter of the cutter circular path and the penetration depth of the cutter. In addition, the height of the cauliflower to be worked is also sensed, and the values for diameter and height are converted into electric signals and then processed to form setting signals. These setting signals are used for electromechanical control of the cutting operation in such a manner that the adjustment of the diameter of the cutter circular path is carried out independently of the adjustment of the cutter penetration depth.

11 Claims, 2 Drawing Sheets

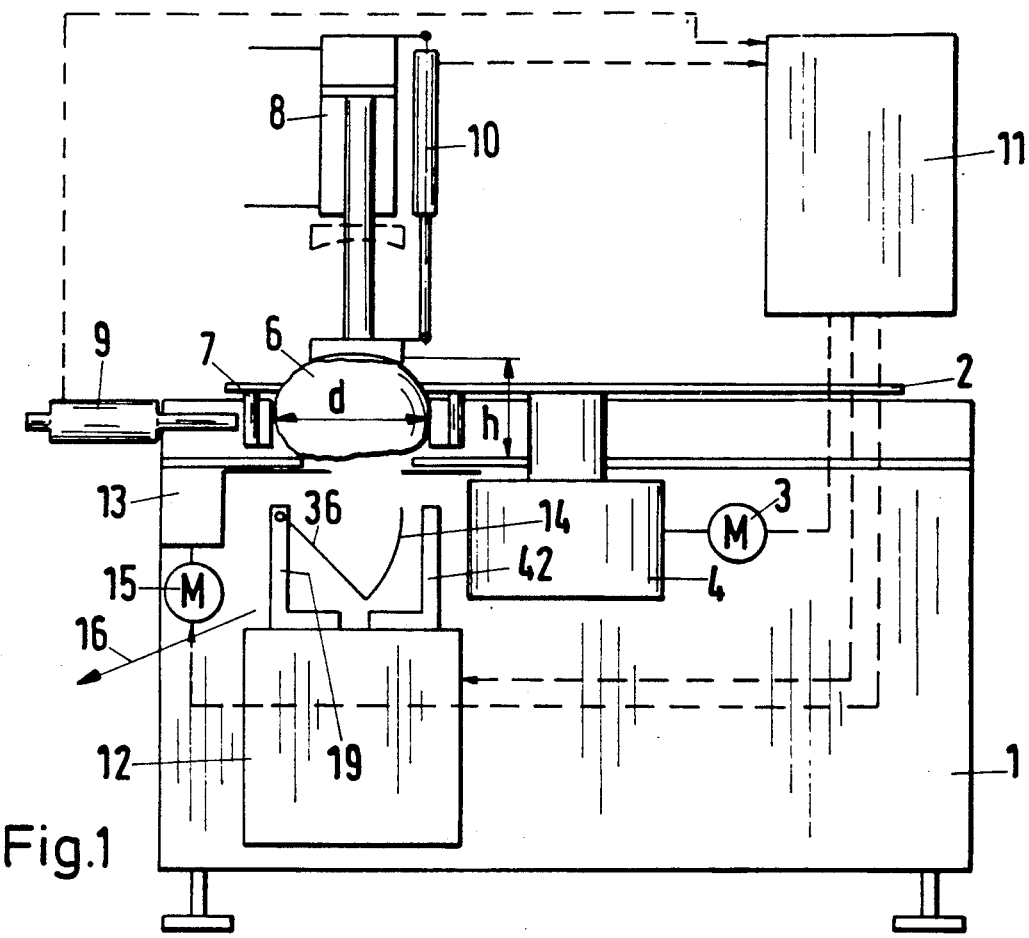
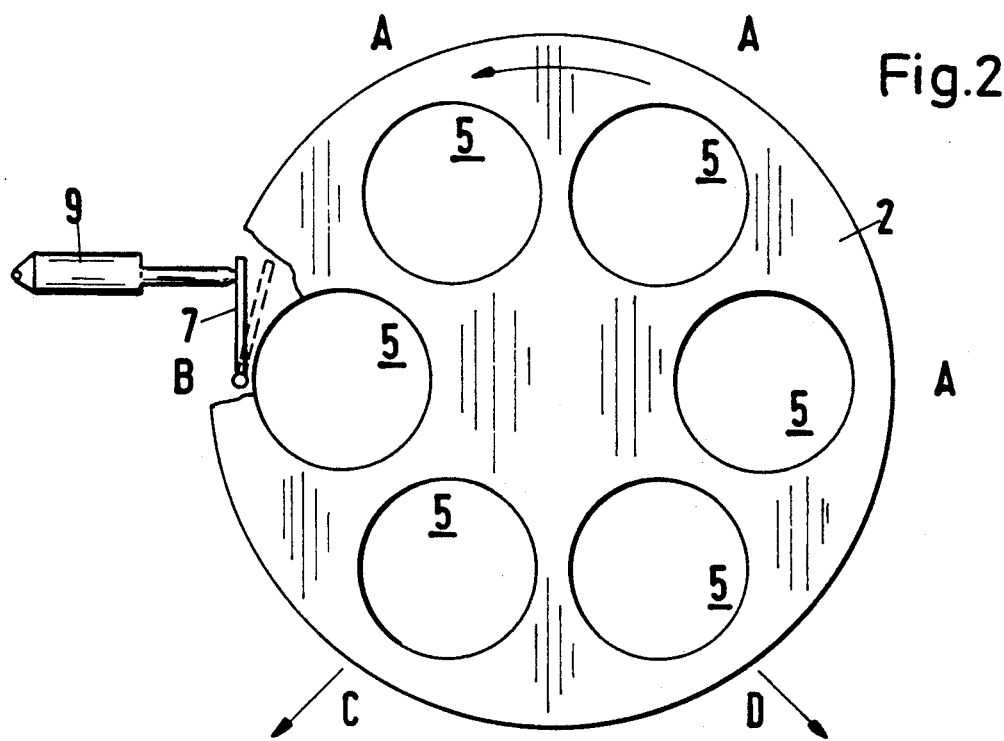

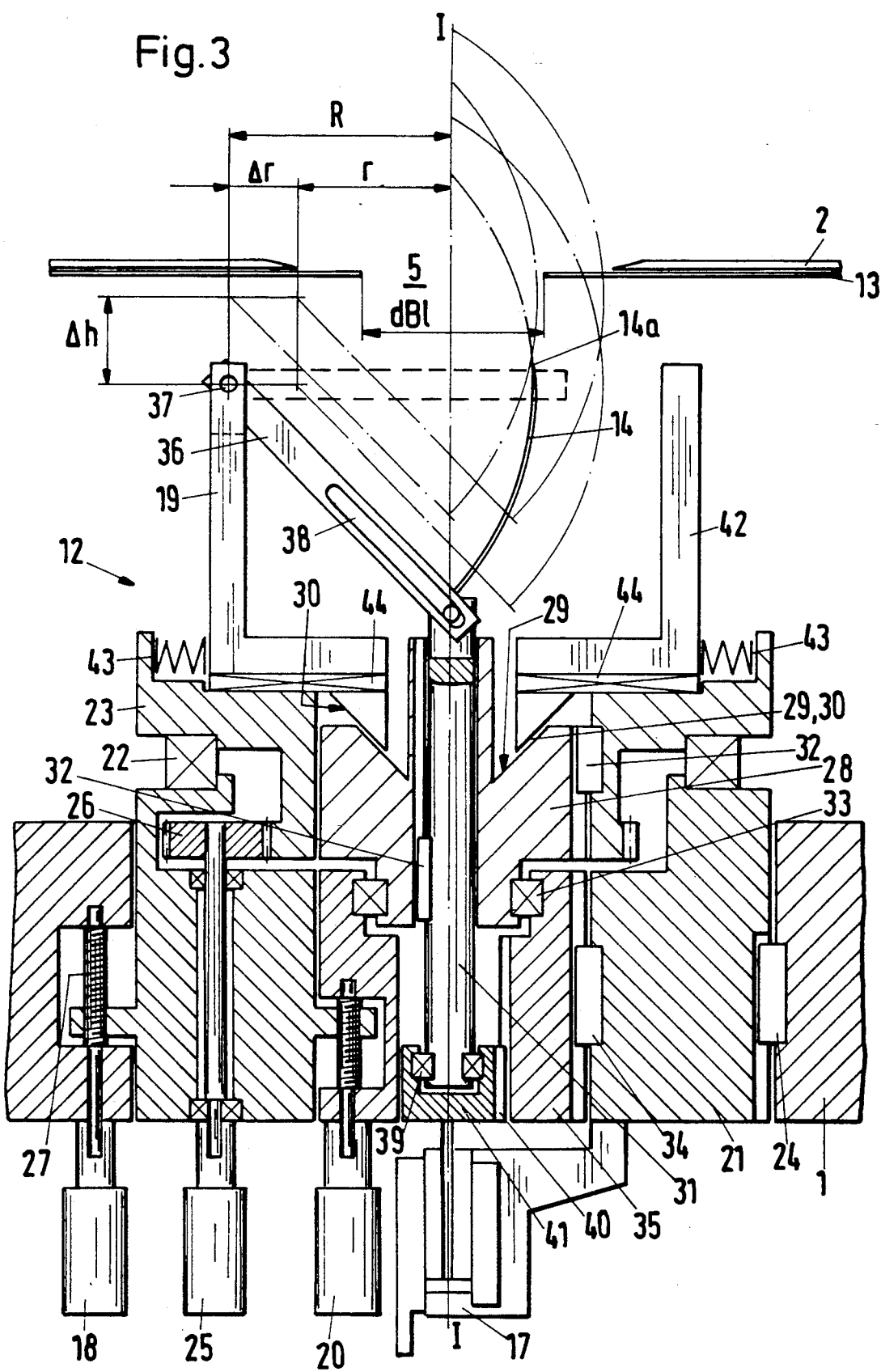

APPARATUS FOR THE CUTTING OUT OF VEGETABLE HEADS

BACKGROUND OF THE INVENTION

The invention relates to a method for the cutting out of vegetables heads, fruits or parts thereof which have on their underside a central part (stipe), which is to be cut out from the surrounding part along a hemispherical or ogival face, in particular cauliflower. The diameter of the cauliflower is established and the value thus determined is used for setting and controlling the cutter which carries out the cutting, guided on a circular path, in particular for adapting the diameter of the cutter circular path and the penetration depth of the cutter.

The invention also relates to an apparatus for the cutting out of vegetable heads, fruits or parts thereof which have on their underside a central part (stipe), which is to be cut out from the surrounding part along a hemispherical or ogival face, in particular cauliflower. The apparatus includes a receptacle for the cauliflower, a sensing device establishing the diameter of said cauliflower, and a cutting head which is arranged underneath the receptacle and which can be driven by means of a rotary drive. The cutting head is preferably rotatable about a vertical axis and is fitted with an arced cutter, which is arced toward said axis, and revolves about the latter and can be pivoted on a circular arc which is convex with respect to this axis by means of a periodically operating lifting drive. The cutting head is pivotable between a lower inactive position and an upper cutting position in which the free cutter tip at least reaches said axis. An adjusting device, actuated by said sensing device, is provided for adjusting the diameter and the height of the cutter path of revolution.

Where reference is made in the following to a cauliflower to be processed, specifying this vegetable is intended to be by way of example only, and it will be understood that the invention is suitable for other food materials as well.

The prior art referred to above is exemplified in German Offenlegungsschrift 2,750,820. Serving as a receptacle for the cauliflower to be processed is a rotary plate which rotates about a vertical axis and has, for example, six openings each for receiving a cauliflower. By means of a drive chain, a step-by-step rotation of the rotary plate as well as a lifting and lowering movement of the cutter take place. By means of a second motor, the rotary drive for the cutting head takes place. Pivotal holding arms, which can be pressed under spring loading against the outer circumference of the cauliflower head, serve for holding firm the cauliflower used. One of these holding arms serves at the same time for establishing the diameter of the cauliflower head and changes the diameter of the cutter path of revolution by means of a cam control. The raising and lowering of the cutter is also controlled by means of cams. In this case, there is a positive kinematic coupling between the adjustment of the diameter and the height of the cutter path of revolution, such that the adjustment of the one parameter also effects at the same time an enforced adjustment of the other parameter.

The restricted adjustment possibilities of the known apparatus prove to be disadvantageous, with the result that cauliflower heads of very small and very large dimensions cannot be readily processed one after the other; rather, a presorting of the cauliflower heads with regard to their size is necessary. It is also disadvantageous that the diameter of the stipe to be cut out cannot be controlled independently of the height of the stipe to be cut out.

SUMMARY OF THE INVENTION

The invention is based on the object of making the method generally described above more precise, and of providing a suitable apparatus for this.

This object is achieved according to the invention in that the height of the cauliflower to be worked is also sensed, and in that the values for diameter and height are converted into electric signals and are then processed to form setting signals which are used for electromechanical control of the cutting operation in the form that said adjustment of the diameter of the cutter circular path is carried out independently of that of the cutter penetration depth.

With regard to the apparatus, said object is achieved by the following features;
a) an additional sensing device for a height sensing of the cauliflower;
b) measured-value pick-ups for converting the variables determined by the two sensing devices into electric signals for an electronic master control system;
c) the adjusting device, actuated by the sensing device, for the cutter comprises a drive which can be separately actuated by the electronic master control system for the height adjustment of the cutting head in relation to the rotary table (height adjusting drive), as well as a drive which can likewise be actuated separately by the master control system for a radial displacement of the cutter bearer (radial adjusting drive).

Consequently, according to the invention, working without presorting of the cauliflower is possible. The cutting operation can be adapted easily to altered product dimensions. The cutting out of different stipe dimensions is possible without exchanging cutters.

An apparatus comparable with the prior art establishing the generic type can be taken from European patent application A2-0244387, which is characterized, however, by a particularly complex and complicated mechanical construction, all the adjusting functions being controlled purely mechanically. In comparison with this prior art, the solution according to the invention results in a considerably simplified construction of the machine. Due to the electromechanical control according to the invention, it is possible to combine all the function adjustments directly in the cutting head and thus keep the remainder of the apparatus completely free from this.

According to the invention, the individual functional parts of the cutting head are subdivided into a lower part, which is held rotationally fixed but is guided adjustably in height by means of a drive which can be actuated separately, and an upper functional part, which can be rotatably driven and is supported on said lower part. It may thus be provided, for example, that the cutting head has a lower part (bottom part) which is held rotationally fixed but can be displaced in height in relation to the machine frame by the height adjusting drive, with an upper part (top part) being supported on the bottom part by means of a supporting bearing which can be rotated by means of the rotary drive and bears the radially displaceable cutter bearer. The radial displacement of the cutter bearer in this case takes place preferably by means of a height-displaceably guided adjusting element, which is actuated by the radial adjusting drive and bears with a wedge slope against the underside of a corresponding wedge slope of the cutter bearer.

In order to relieve the wedge slopes during operation to a great extent of the centrifugal force acting on the cutter bearer, it is advantageous if the cutter bearer is supported in the direction of the centrifugal force acting on it during rotation against a compression spring or the like.

To achieve, as far as possible, silent running of the rotating cutting head, it is advantageous if the cutter bearer is assigned a compensating weight, having at least approximately the same mass, which weight is arranged offset by 180° and, seen mirror-symmetrically, is subjected to the same radial displacement as the cutter bearer.

In comparison with the known apparatuses, wear is considerably lower in the case of the embodiment according to the invention. Further features of the invention are explained in more detail with reference to an exemplary embodiment.

BRIEF DESCRIPTION OF THE DRAWINGS

An embodiment of the invention, serving as an example, is represented diagrammatically in the drawings, in which: FIG. 1 is a partially diagrammatic side elevational view of the apparatus in accordance with the invention for the cutting out of vegetable heads or the like; FIG. 2 is a top plan view of the rotary table shown in FIG. 1, and in plan view and FIG. 3 is an enlarged vertical cross-sectional view through a cutting head.

DETAILED DESCRIPTION OF THE PREFERRED EMBODIMENTS

The apparatus diagrammatically represented in FIG. 1 includes a machine frame 1, on which a rotary table 2 is mounted for rotation rotatable about a vertical axis and driven by means of a motor 3 and a stepping gear 4. The rotary table 2 has six openings 5 (FIG. 2) each adapted to receive a cauliflower head 6. The table is turned through incremental stepping advancements each of which is equal to the angular distance between two openings 5.

At one of the positions A shown top left in FIG. 2, the cauliflower head 6 to be worked is placed in an opening 5 of the rotary table 2. The rotary table 2 is then rotated by means of the stepping gear 4 so that the head 6 is moved into position B, where the cauliflower is sensed with regard to diameter by clamping arms 7 which are placed against its outer circumference. The height of the head is measured by height sensing means 8 the lower end of which contacts the top of the head. By means of a measured-value pick-up 9, assigned to the clamping arms 7, as well as a measured-value pick-up 10, assigned to the height sensing means 8, the sensed values for diameter d and height h are converted into electric signals and passed to an electronic master control system 11 shown diagrammatically in FIG. 1. The rotary table 2 is then turned into the position C, while at the same time the size parameters determined are being processed by the master control system 11 into setting signals for a cutting head 12. The head 12 is electromechanically set by means of the setting signals in such a way that a cutting operation is obtained which cuts out the stipe with desired dimensions.

The cutting operation takes place in this case in a number of substeps: First, an aperture plate 13, provided underneath the opening 5 of the rotary table 2, is opened to the diameter required to allow the cutter 14 to pass through. The plate 13 is opened by means of a motor 15, which like the motor 3 for driving the rotary table 2, is controlled by the master control system 11. The cutting operation is executed by upward and downward pivoting of the cutter 14, which rotates continuously during the processing. This control is also performed by means of the electronic master control system 11. The cut-out stipe is conveyed downward with the downward movement of the cutter 14 and thrown out of the machine by the rotating movement of the cutting head 12 in the direction of the arrow 16. Subsequently, the aperture plate 13 is closed, and the rotary table 2 is rotated into position D where the cauliflower drops downwardly out of the machine. Due to the further conveying by the rotary table 2 and due to such dropping down, the cauliflower breaks up into individual cloves.

With each further turning of the rotary table 2, the described sequence takes place in the positions A to D, the master control system 11 controlling and coordinating all the movement sequences. By altering electrical manipulated variables, the user of the machine can adjust the cutting parameters (relationship between stipe diameter and stipe height) to the measured variables sensed. The setting of the stipe diameter and the stipe height can be carried out independently of each other, the master control system 11 automatically compensating for a slight mutual influencing of the parameters.

FIG. 3 shows the preferred embodiment of the cutting head 12, which has a vertical axis of rotation I—I. The rotary table 2 with its opening 5 for receiving the cauliflower to be processed is shown in FIG. 3, but in limited detail, as is, the adjustable aperture plate 13 arranged underneath the table. The cutting head 12 is fitted with an arced cutter 14, which is arced toward and revolves about the axis of rotation I—I. The cutting head is pivoted on a circular arc which is convex with respect to this axis I—I, by means of a periodically operating lifting drive 17 which is movable between a lower inactive position and an upper cutting position, in which the free cutter tip 14a at least reaches said axis I—I.

The adjusting device, actuated by the sensing devices 7, 8, for the cutter 14 comprises a drive which can be actuated separately by the electronic master control system 11 for the height adjustment of the cutting head 12 relative to the rotary table 2, referred to hereinafter as height adjusting drive 18. The adjusting device further includes a radial drive 20, which can likewise be actuated separately by the master control system 11 for radial displacement of the cutter bearer 19.

The cutting head 12 has a lower bottom part 21 which is held rotationally fixed but can be displaced in height in relation to the machine frame 1 by the height adjusting drive 18. An upper top part 23 is supported on the bottom part 21 by means of a supporting bearing 22. The upper top part 23 can be rotated by means of a rotary drive and has mounted thereon the radially displaceable cutter bearer 19. The bottom part 21 is secured against turning by a guide 24. The height adjusting drive 18 is represented by way of example as a threaded spindle and nut. By the height adjusting drive 18, the position of the cutting system with respect to the machine frame 1, and consequently with respect to the, table 2, can be altered (Δh). The rotary drive comprises a drive motor 25 which drives the top part 23 by means of a shaft and a gear wheel stage 26. The height adjusting drive 18 displaces the bottom part 21 in the vertical direction by rotation of spindle 27.

The radial displacement of the cutter bearer 19 takes place by means of a height-displaceably guided adjusting element 28, which is actuated by the radial adjusting drive 20 and includes a wedge slope 29 which bears against the underside of a corresponding wedge slope 30 of the cutter bearer 19. The adjusting element 28 is designed as a bush and is mounted displaceably on a push rod 31 and is in rotational connection with the top part 23 by means of a carrier 32, but is height-displaceable relative to said top part. The adjusting element 28 is supported by means of a supporting bearing 33 on a basic body 35, which is secured against turning by means of a guide 34 but which can be displaced in height relative to the bottom part 21 by the radial adjusting drive 20.

The lifting movement of the cutter 14 takes place by means of the push rod 31 described above, which is in rotational connection by means of two carriers 32 with the top part 23, but which can be displaced in height relative to the latter by the lifting drive 17. This lifting drive is a linear drive, which may comprise, for example, a pneumatic cylinder, and is supported on the bottom part 21.

The cutter 14 is mounted on a guide rod 36, which is pivotably mounted by its one end at 37 on the cutter bearer 19. The guide rod is formed with a slot guide 38 which cooperates with its upper end of the push rod 31 for longitudinally displaceably guiding the rod 36. The push rod 31 is supported at its lower end by means of a supporting bearing 39 on a lifting part 41, which is held rotationally fixed by means of a guide 40 but can be displaced in height relative to the bottom part 21 by the drive 17. The lifting movement effected by the lifting drive 17 is transmitted to the cutter bearer 19. The cutter 14 is pivoted upward until its cutter tip 14a reaches the axis of rotation I—I. In so doing, an approximately conical stipe is cut out by the rotating movement of the cutter 14. Once the cut has been made, the lifting drive 17 moves the cutter 14 back into its basic position.

The cutter bearer 19 is assigned a compensating weight 42 having at least approximately the same mass, which weight is arranged offset by 180° and, seen mirror-symmetrically, is subjected to the same radial displacement as the cutter bearer 19.

The cutter bearer 19 and the compensating weight 42, in the direction of the centrifugal force acting on them during rotation, bear against compression springs 43. Cutter bearer 19 and compensating weight 42 are guided in their radial displacement by means of linear guides 44 on the top part 23.

The cutting head 12 consequently comprises a plurality of systems which can be displaced independently of one another and effect the adjustment of the cutting parameters "height" and "diameter". The systems in each case comprise a lower, height-displaceable, displaceable, but non-rotating part, on which in each case an upper rotating part is supported. The two parts are in each case decoupled in such a way that displacing them together in the vertical direction remains possible.

What is claimed is:

1. Apparatus for the cutting out of vegetable heads, fruits or parts thereof which have on their underside a central part which is to be cut out from the surrounding part of the head, comprising:

a rotary table for supporting and rotating said head to and between stations;

means for sensing the diameter and height of said head, and means for converting said sensed values into electric signals communicating with an electronic master control system;

a cutting head arranged beneath said table and means for mounting said cutting head about a vertical axis, said cutting head including a radially displaceable cutter bearer and a cutter in the form of an arc which is convex relative to said vertical axis;

means for independently lifting and rotating said cutter, said cutter being vertically movable between a lower inactive position and an upper cutting position wherein a top of said arced cutter at least reaches said vertical axis whereby the central part is severally cut from the head; and an adjusting device operated by said master controll system in response to said electric signals for adjusting the height of said arced cutter and the effective diameter thereof;

said adjusting device comprising a lifting and rotary drive, and means operatively interconnecting said lifting and rotary drive to said cutting head in such a manner that said diameter and the height adjustment of the cutting head relative to said table are independently adjustable depending on the diameter and height of said head.

2. Apparatus for the cutting out of vegetable heads, fruits or parts thereof which have on their underside a central part which is to be cut out from the surrounding part of the head, comprising:

a rotary table for supporting and rotating said head to and between stations;

means for sensing the diameter and height of said head, and means for converting said sensed values into electric signals communicating with an electronic master control system;

a cutting head arranged beneath said table and means for mounting said cutting head about a vertical axis, said cutting head including a radially displaceable cutter bearer and a cutter in the form of an arc which is convex relative to said vertical axis;

means for independently lifting and rotating said cutter, said cutter being vertically movable between a lower inactive position and an upper cutting position wherein a top of said arced cutter at least reaches said vertical axis whereby the central part is severally cut from the head; and an adjusting device operated by said master control system in response to said electric signals for adjusting the height of said arced cutter and the effective diameter thereof;

said adjusting device comprising a lifting and rotary drive, and means operatively interconnecting said lifting and rotary drive to said cutting head in such a manner that said diameter and the height adjustment of the cutting head relative to said table are independently adjustable depending on the diameter and height of said head;

wherein said cutting head further comprises a lower part which is held rotationally fixed but can be adjustably displaced in height relative to a frame of the apparatus by said lifting drive, an upper part of said cutting head supported on said lower part by a supporting bearing, said upper part being rotatable by said rotary drive and bearing against the radially displaceable cutter bearer.

3. The apparatus as claimed in claim 2, wherein the radial displacement of the cutter bearer takes place by means of a height-displaceably guided adjusting element, said element having a wedge slope which bears against the underside of a corresponding wedge slope of the cutter bearer when radial adjustment is to be effected.

4. The apparatus as claimed in claim 3, wherein said adjusting element is displaceably mounted, is in rotational connection with said upper part of the cutting head, but is at the same time height-displaceable relative to said upper part so that said independent adjustment can be effected.

5. The apparatus as claimed in claim 3, wherein said adjusting element is supported by means of a supporting bearing on a body member which is held rotationally fixed but which can be displaced in height relative to the lower part of the cutting head by a radial adjusting drive.

6. The apparatus as claimed in claim 3, wherein said cutter is lifted by means of a push rod which is in rotational connection with the upper part of the cutting head but can be displaced in height relative to the cutting head by said lifting drive.

7. The apparatus as claimed in claim 6, wherein said cutter is fastened to a guide rod which is pivotally connected at one end thereof to said cutter bearer and is longitudinally displaceably guided at its other end by a slot guide operatively connected to the upper end of the push rod.

8. The apparatus as claimed in claim 6, wherein said push rod is supported at its lower end by means of a supporting bearing on a lifting part which is held rotationally fixed but can be displaced in height relative to the bottom part of the cutting head by said lifting drive.

9. The apparatus as claimed in claim 6, wherein said adjusting element is designed as a bush and is mounted displaceably on said push rod.

10. Apparatus for the cutting out of vegetable heads, fruits or parts thereof which have on their underside a central part which is to be cut out from the surrounding part of the head, comprising:
    a rotary table for supporting and rotating said head to and between stations;
    means for sensing the diameter and height of said head, and means for converting said sensed values into electric signals communicating with an electronic master control system;
    a cutting head arranged beneath said table and means for mounting said cutting head about a vertical axis, said cutting head including a radially displaceable cutter bearer and a cutter in the form of an arc which is convex relative to said vertical axis;
    means for independently lifting and rotating said cutter, said cutter being vertically movable between a lower inactive position and an upper cutting position wherein a top of said arced cutter at least reaches said vertical axis whereby the central part is severally cut from the head; and
    an adjusting device operated by said master control system in response to said electric signals for adjusting the height of said arced cutter and the effective diameter thereof;
    said adjusting device comprising a lifting and rotary drive, and means operatively interconnecting said lifting and rotary drive to said cutting head in such a manner that said diameter and the height adjustment of the cutting head relative to said table are independently adjustable depending on the diameter and height of said head;
    wherein said cutter bearer is assigned a compensating weight having at least approximately the same mass, which weight is arranged offset from said cutter bearer by 180° and, seen mirror-symmetrically, is subjected to the same radial displacement as the cutter bearer.

11. The apparatus as claimed in claim 10, wherein said cutter bearer and said compensating weight are supported in the direction of the centrifugal force acting on them during rotation against a compression spring.

* * * * *